US008669995B2

(12) United States Patent
Winnemoeller et al.

(10) Patent No.: US 8,669,995 B2
(45) Date of Patent: Mar. 11, 2014

(54) METHODS AND APPARATUS FOR STROKE GROUPING FOR HIGH-LEVEL SKETCH EDITING

(75) Inventors: Holger Winnemoeller, Seattle, WA (US); Wilmot Wei-Mau Li, San Francisco, CA (US); Matthias Trapp, Potsdam (DE)

(73) Assignee: Adobe Systems Incorporated, San Jose, CA (US)

( * ) Notice: Subject to any disclaimer, the term of this patent is extended or adjusted under 35 U.S.C. 154(b) by 623 days.

(21) Appl. No.: 12/957,019

(22) Filed: Nov. 30, 2010

(65) Prior Publication Data
US 2013/0127869 A1 May 23, 2013

Related U.S. Application Data

(60) Provisional application No. 61/391,531, filed on Oct. 8, 2010.

(51) Int. Cl.
| G06T 11/00 | (2006.01) |
| G09G 5/00 | (2006.01) |
| G06K 15/00 | (2006.01) |
| G06K 9/46 | (2006.01) |
| G06K 9/68 | (2006.01) |
| G06K 9/36 | (2006.01) |
| G06K 9/03 | (2006.01) |
| H04N 1/46 | (2006.01) |
| G06F 17/00 | (2006.01) |
| G06F 3/00 | (2006.01) |

(52) U.S. Cl.
USPC ........... 345/581; 345/606; 345/467; 345/619; 358/2.1; 358/537; 382/202; 382/218; 382/276; 382/311; 715/200; 715/700

(58) Field of Classification Search
USPC ................ 345/581, 606, 619, 636, 443, 467, 345/471–473; 358/1.1, 1.9, 2.1, 2.99, 537, 358/452, 470, 478, 3.27, 1.11, 525, 462; 382/182, 187, 189, 202, 203, 276, 290, 382/293, 298, 300–301, 311, 218, 219, 382/224–225; 715/200, 255–256, 262–263, 715/700
See application file for complete search history.

(56) References Cited

U.S. PATENT DOCUMENTS

| 5,850,477 | A | * | 12/1998 | Takada | 382/186 |
| 5,991,441 | A | * | 11/1999 | Jourjine | 382/187 |
| 6,408,091 | B1 | * | 6/2002 | Sakaguchi et al. | 382/187 |
| 6,778,712 | B1 | * | 8/2004 | Yabuki et al. | 382/305 |
| 2011/0134068 | A1 | * | 6/2011 | Shimoni | 345/173 |
| 2012/0038735 | A1 | * | 2/2012 | Hasegawa | 347/217 |

OTHER PUBLICATIONS

Baran, I., Lehtinen, J., & Popović, J. (n.d.). Sketching Clothoid Splines Using Shortest Paths. Retrived from https://zerowing.corp.adobe.com/display/atlresearch/Fair+Curves+from+Freehand+Sketches. pp. 1-15.

(Continued)

*Primary Examiner* — Wesner Sajous
(74) *Attorney, Agent, or Firm* — Wolfe-SBMC

(57) ABSTRACT

Attributes of a graphical element are compared to attributes of one or more groups of graphical elements. Responsive to identifying a similarity between the graphical element and a group of graphical elements among the one or more groups, the graphical element is added to the group of graphical elements. The adding enables editing operations performed with respect to the group of graphical elements to result in changes to the graphical element.

20 Claims, 12 Drawing Sheets

(56) References Cited

OTHER PUBLICATIONS

Barla, P., Breslav, S., Thollot, J., Sillion, F., & Markosian, L. (2006). Stroke pattern analysis and synthesis. Eurographics. From Proceedings of Eurographics 2006: Computer Graphics Forum 25 (2006) pp. 1-9.

Barla, P., J.Thollot, & Sillion, F. X. (2005). Geometric clustering for line drawing simplification. Eurographics Symposium on Rendering. pp. 1-10.

Igarashi, T., Matsuoka, S., Kawachiya, S., & Tanaka, H. (1997). Interactive Beautification:A Technique for Rapid Geometric Design. UIST, pp. 105-114.

Olsen, L., Samavati, F. F., Sousa, M. C., & A.Jorge, J. (2008). Sketch-based modeling:A survey. Computers & Graphics. pp. 1-39.

Pusch, R., Samavati, F., Nasri, A., & Wyvill, B. (n.d.). Improving the Sketch-Based Interface—Forming Curves from Many Small Strokes. The Visual Computer. pp. 1-8.

Saund, E. (n.d.). Eric Saund Publications. Retrieved from http://www.parc.com/about/people/167/eric-saund.html, copyright 2002-2012, pp. 1-4.

Orbay, G., & Kara, L. B. (2010). Beautification of Design Sketches Using Trainable Stroke Clustering and Curve Fitting. IEEE Transactions on Visualization and Computer Graphics, pp. 1-17.

* cited by examiner

METHODS AND APPARATUS FOR STROKE GROUPING FOR HIGH-LEVEL SKETCH EDITING

This application claims benefit of priority to U.S. Provisional Application Ser. No. 61/391,531, which was files on Oct. 8, 2010.

BACKGROUND

Description of the Related Art

A sketch is a rapidly executed freehand drawing. In its typical artistic uses, sketching sharpens an artist's ability to focus on the most important elements of a subject and is a prescribed part of artistic development for students. Additionally, the ability to quickly record impressions through sketching has found varied purposes in today's culture. Courtroom artists are usually sketchers. Sketches drawn to help authorities find or identify wanted people are called composite sketches, and are used in the investigation of crimes. Street performers in popular tourist areas often include artists who sketch portraits within minutes. Additionally, the profusion of newly-developed tools for image creation and editing has led to a concomitant growth in the number of digital sketches created and edited.

Current digital sketching tools suffer from a structural unawareness of the sketched content. For sketching tools based on raster graphics, structural unawareness results in individual strokes that are blended at the pixel level and are thereafter indistinguishable from one another. While vector graphics programs may retain vital information about individual sketch strokes, vector graphics programs do not relate these individual sketch strokes to one another. The result is a disconnected "soup of strokes," which is difficult to edit at a structural level. The user may impose explicit structure via manual grouping, but this process is labor intensive, error prone, and potentially ephemeral.

SUMMARY

Attributes of a graphical element are compared to attributes of one or more groups of graphical elements. Responsive to identifying a similarity between the graphical element and a group of graphical elements among the one or more groups, the graphical element is added to the group of graphical elements. The adding enables editing operations performed with respect to the group of graphical elements to result in changes to the graphical element.

Figure 1:
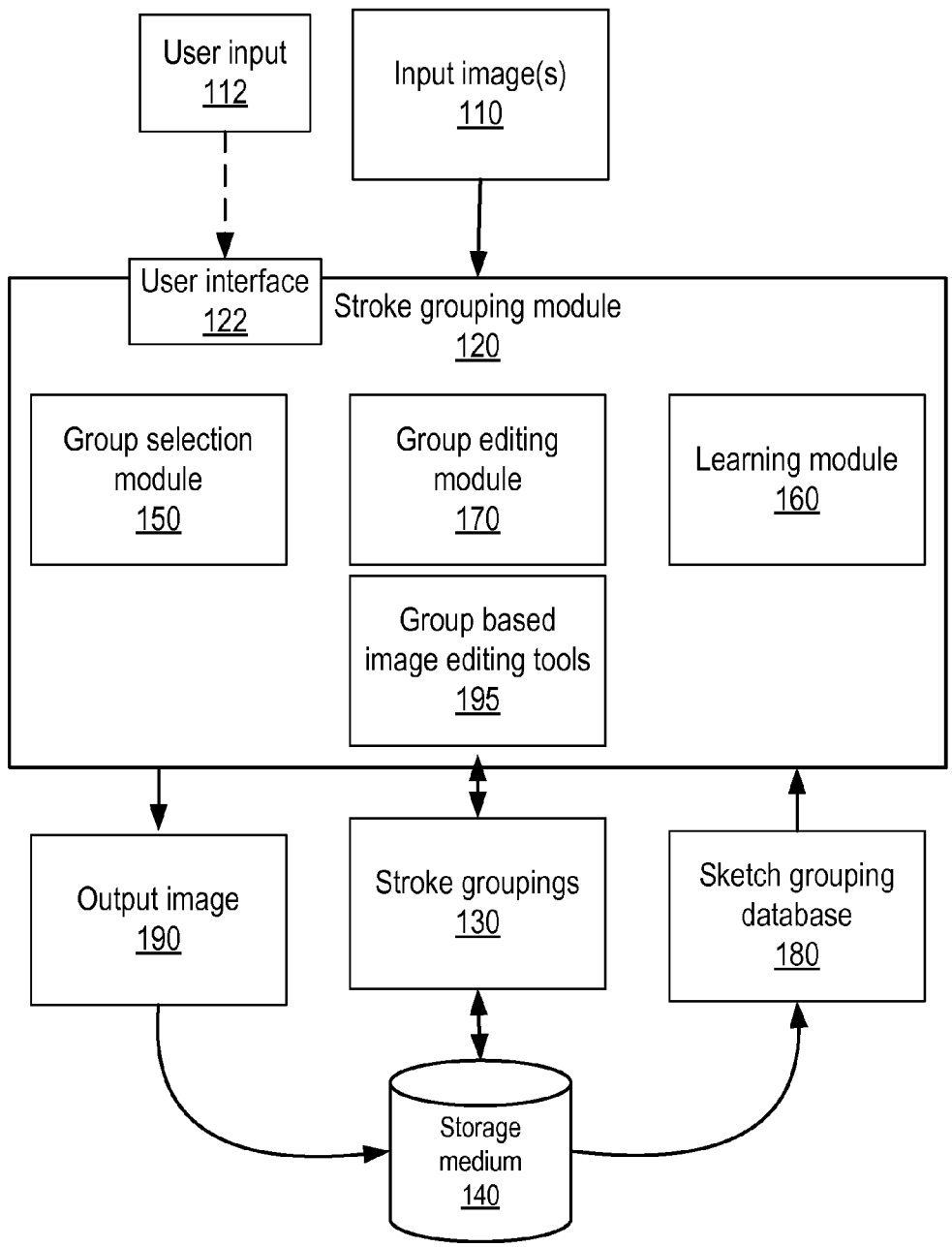
FIG. 1 illustrates a stroke grouping module according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for grouping strokes for high-level editing are disclosed. In one embodiment, strokes are analyzed as they are entered by the user and automatically assigned to a multi-level grouping structure. Subsequently, when the user initiates a correction or edits the current sketch, the user can either utilize a default automatic grouping suggested by the system, or can perform a simple selection gesture to select a different automatic grouping (or parts thereof), thereby facilitating editing operations by means of automatic and semi-automatic groupings of structurally meaningful sketch components.

Example Implementations

FIG. 1 illustrates a stroke grouping module that may implement one or more of the stroke grouping for high-level editing techniques and tools illustrated in FIGS. 1 through 12. While the present embodiments are discussed with respect to stroke grouping, one of skill in the art will realize in light of the present disclosure that a stroke is a graphical element and that the present invention is broadly applicable to grouping and editing of both strokes and other graphical elements that exhibit properties and attributes similar to the strokes discussed herein. As a result, the terms graphical element and stroke, as used herein, are interchangeable with respect to the disclosed embodiments and to other embodiments within the scope and intent of the present disclosure. Stroke grouping module 120 may, for example, implement one or more of stroke grouping at stroke entry, comprehensive stroke grouping from an existing image, stroke group learning, stroke group editing, and stroke group merger and division. FIG. 13 illustrates an example computer system on which embodiments of stroke grouping module 120 may be implemented. Stroke grouping module 120 receives as input one or more digital input images 110 and/or one or more stroke gestures as user input 112. An input image 110 may consist of a large number of individual strokes. In one embodiment, input image 110 is a vector-based graphical data structure. An example image is shown in FIG. 3A. Module 120 may also receive user input 112 activating stroke group editing tool.

Stroke grouping module 120 then groups individual sketch strokes within input image(s) 110 or received as user input 112 via an user interface 122, using a group selection module 150. Stroke grouping module 120 generates as output one or more stroke groupings 130 (also called stroke groups). Any new stroke entering the system is compared to any existing stroke groups. A stroke group (or grouping) describes the collection of individual strokes belonging to it, as well as aggregate attributes of the group itself. These group attributes may be similar to the stroke level attributes, but may omit some attributes of the individual strokes or add others.

The user may edit stroke groupings 130 using a stroke group editing tool of user interface 122 and a group editing module 170. Stroke groupings 130 may, for example, be stored to a storage medium 140, such as system memory, a disk drive, DVD, CD, etc. A learning module 160 is included in order to enable embodiments to adaptively improve grouping results provided by stroke grouping module 120. A sketch grouping database 180 provides a record of grouping preferences, which can be either general preferences or user-specific preferences, and results, including results of from group editing module 170 and learning module 160.

In some embodiments, stroke grouping module 120 may provide a user interface 122 via which a user may interact with stroke grouping module 120, for example to perform stroke entry, initiate stroke group learning, perform stroke group editing, and stroke group merger and division, to perform a selection gesture, and to perform editing based on stroke groups as described herein. In some embodiments, the user interface may provide user interface elements whereby the user may select options including, but not limited to, the attributes on which automated stroke grouping is to be based, thereby reducing enabling the user to achieve groupings with limited interaction with the image itself. In some embodiments, user interface 122 may provide user interface elements whereby the user may specify whether the tool is to apply stroke grouping to particular portions of or the entirety of an image, or whether the tool is to infer strokes from an existing image. In some embodiments, user interface 122 may provide user interface elements whereby the user may specify which layers data is to be sampled from for stroke grouping.

In some embodiments, stroke grouping module 120 will include group-based image editing tools 195 for providing editing functions enabled by the particular properties of groups created by group selection module 150 and creating output images 190 that are stored in storage medium 140.

Example Operations

Figure 2:
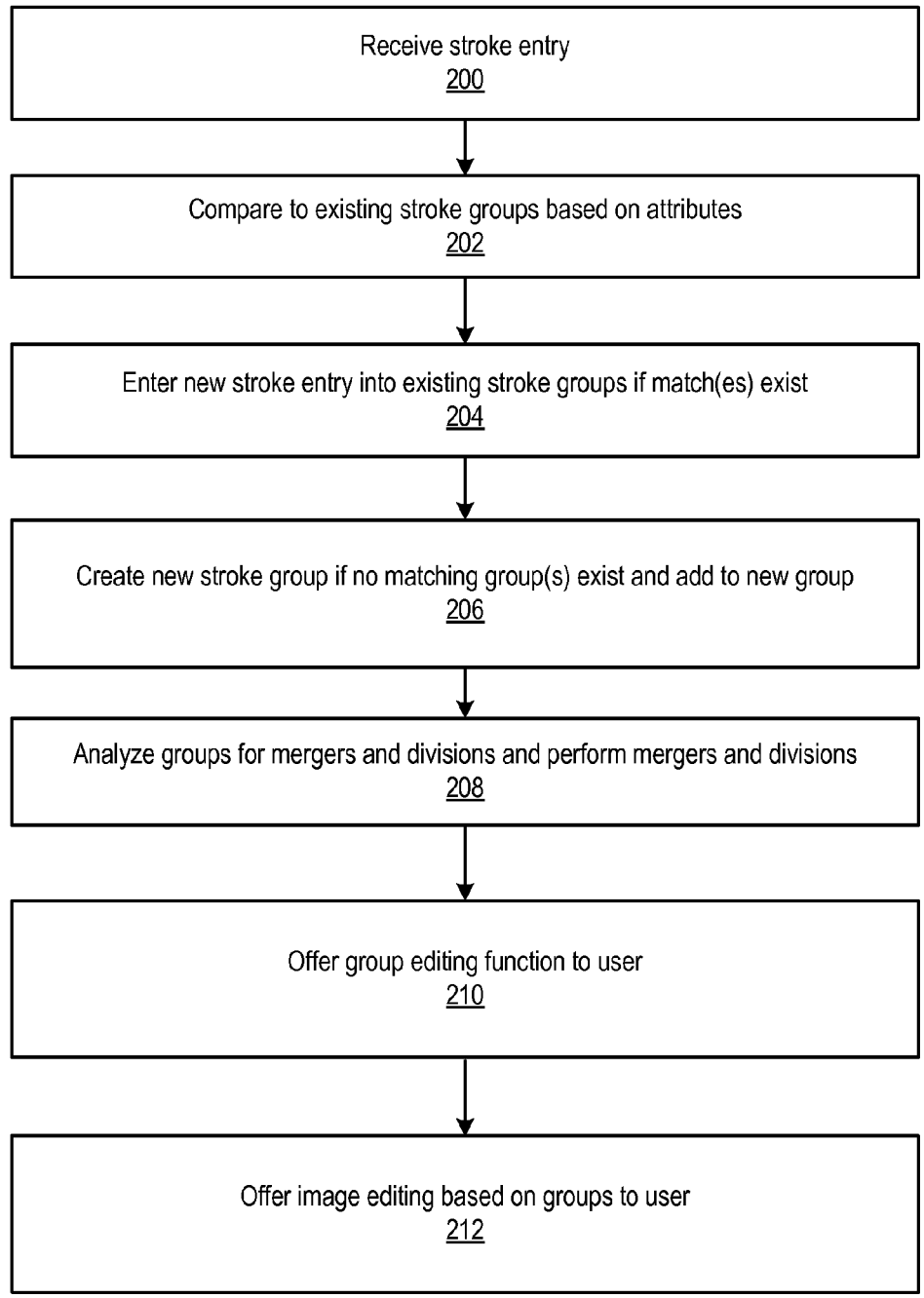
FIG. 2 illustrates a high-level logical flowchart of operations performed in embodiments of a system for stroke grouping for high-level sketch editing.
Figure 3:
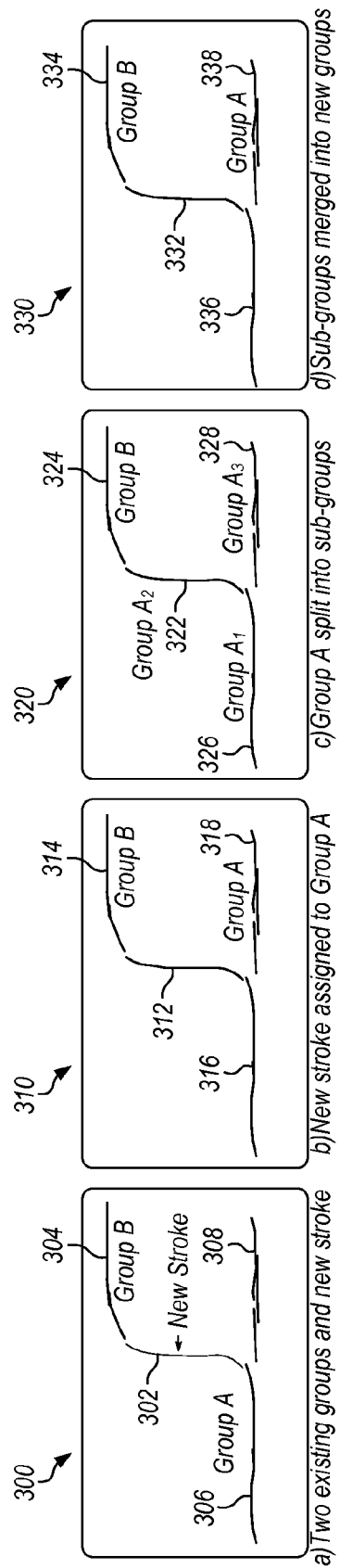
FIGS. 3A-3D illustrate entry of a new stroke followed by a three example grouping operations according to one embodiment.

FIG. 2 illustrates a high-level logical flowchart of operations performed in embodiments of a system for stroke grouping for high-level sketch editing. Stroke entry is received (200). In one embodiment, stroke entry is received through a user interface, such as user interface 122 of FIG. 1, at the time of entry of the individual stroke by a user. The user adds strokes to a sketch via some suitable interface (mouse, stylus, multi-touch, etc.). In some embodiments, a stroke is represented as a polyline (a sequence of two-dimensional positions that are considered to be connected between each adjacent pair in the sequence). However, in other embodiments, a stroke is represented as a Bezier curve or some other parametric representation.

In some embodiments, a previously created graphical data structure is received and stroke grouping is performed after receipt of the data structure. In such embodiments, receipt of the graphical data structure as input images 110 of FIG. 1, constitutes receipt of stroke entry. An individual stroke is compared for matching purposes to existing stroke groups based on attributes of the stroke (202) and attributes of the stroke group. These attributes may include, but are not limited to arc-length, curvature, orientation or other attributes of an object-oriented bounding box, centroid of vertices, color, thickness, and timing of entry. Embodiments may operate on certain attributes and not others, depending upon user preferences or upon the availability of information with respect to some attributes. As an example, some embodiments support grouping on the basis of temporal information with respect to strokes, where that information is available. A quantitative representation of an attribute of a stroke is established. Respective quantitative representations of a corresponding attribute of each of the stroke groups are created.

At a high level, matching uses machine learning techniques, along with, in some embodiments, content of a sketch grouping database, such as a database of manually grouped sketches, to determine based on the evidence in the database, whether a stroke matches any existing group. A number of machine learning approaches are suitable, and some suitable approaches are discussed below. One skilled in the art, however, will realize in light of the present disclosure that additional approaches may be used without departing from the scope and intent of the disclosed embodiments.

A stroke may be matched to a stroke grouping in a variety of ways. For example, attributes of the stroke may be compared to attributes of any or all of the strokes in a group and the stroke may be added to the group if a similarity between the stroke and one of the groups of strokes is identified. Identifying a similarity, in some embodiments, involves comparing the quantitative representation of the stroke to the respective quantitative representations of the attribute for each stroke group. In some embodiments, if the attributes of the new stroke match well to attributes of any (or, alternatively, all) of the existing strokes, the stoke can be added to the relevant stroke group. Such matching between pairs of strokes may be accomplished, in some embodiments, via a machine learning approach.

Thus, in some embodiments, an aggregate attribute value for one or more strokes of each of the one or more stroke groups is created and compared to the quantitative representation of the attribute of the stroke in question. Alternatively, the stroke may be evaluated by computing aggregate properties of the stroke group (overall curvature, curvature since last extremum, orientation or boundaries of object-oriented bounding box, etc.) as if the stroke had been added to the group and comparing these aggregate properties to the aggregate properties of the group before adding the stroke. If the addition of the stroke does not lead to a significant change (e.g., change above a threshold or thresholds) in properties, the stroke is added to the group and the newly computed aggregate properties are used as the properties of the thus-extended group. Any suitable combination of stroke-to-stroke and group properties may also be employed, as may other decision approaches.

If the individual stroke matches an existing stroke group or groups, the individual stroke is entered into the matching stroke group or groups (204). If the individual stroke does not match any existing stroke group or groups, a new stroke group is created and the individual stroke is entered into the new stroke group (206). Groups are analyzed for group merger or group divisions and mergers and divisions are performed (208). A group editing function is offered to a user (210). The user is not limited to working with the automatic groupings suggested by a stroke grouping module. For example, the user can perform a selection suggestion stroke, described below with respect to FIG. 6 and thereby select parts of neighboring groups into a temporary selection group to be edited. Additionally, grouping behavior may be sensitive to the level of detail of a sketch or other input image containing a stroke. For example, if a hierarchical grouping mechanism is implemented, the grouping suggested by the system may depend on the current zoom (magnification) level at which the user is interacting with the input image or sketch.

Some embodiments may separate operations for grouping into two phases. A first phase may include blocks 202-206. If no groups exist (new sketch), or the new stroke cannot be matched to an existing group, then a new group is created with the stroke as its first content. If a stroke can be matched to one or more existing groups, it is assigned to one or more (in some embodiments, all) of these groups, depending on the particular grouping mechanism employed. The first phase can be considered a local operation in that the first phase compares a single stroke to candidate groups. Some embodiments are configured to spatially limit the groups that are considered as candidates to improve efficiency. This can be achieved through use of a suitable spatial data structure, such as a binary space partition tree, or a quad tree.

A second phase is represented by block 208 and FIG. 4, below. In some embodiments, once an existing group is modified (by adding a new stroke to it), the group is compared to neighboring groups to ascertain whether a merging or division of groups should take place. For example, a new stroke added in FIG. 3A below connects two previously disconnected groups. These disconnected groups are then merged into one larger group in FIGS. 3C-3D, described below.

Image editing based on groups is also offered to the user (212). Image editing operations allow for manipulations performed on a stroke group to result in changes to any or all strokes within that group. Given the automatic groupings derived above, the user may edit an image by manipulating grouped strokes with existing tools, for example by translating, scaling, or rotating the group using affine transformations. The user can also perform more high-level operations using the grouping. For example, the system may compute a "clean line" representation of a stroke grouping and may add the new stroke to the clean line representation, as discussed in more detail below with respect to FIG. 8. A clean line is a simplified representation of all strokes contained within a group and acts as their proxy to reduce the visual and computational complexity of the original raw data. The user may then deform the shape of the clean line, the result of which is an implicit deformation of the stroke group associated with the clean line. The clean line may be explicitly visualized to the user, along with any interaction widgets (such as control point widgets, etc.), or not visualized and only used implicitly to facilitate mapping of user input to the deformation of the stroke group. While the term "clean line" is used herein, one skilled in the art will realize that such a proxy is not necessarily a line, but can also be a polygon that approximates an area covered by strokes (e.g., hatching, fills, etc.). In some embodiments, the type (line or polygon) of a proxy can influence which group based image editing tools are most appropriate for interaction with the group.

Grouping Examples

FIGS. 3A-3D illustrate entry of a new stroke followed by a three example grouping operations according to one embodiment. In FIG. 3A, a first sketch 300 shows receipt of a new stroke 302 to be added to a group B composed of a top stroke 304 or a group A composed of bottom left strokes 306 and bottom right strokes 308. FIG. 3A corresponds to block 200 of FIG. 2, described above.

In FIG. 3B, a second sketch 310 shows inclusion of new stroke 312 with group A composed of bottom left strokes 316 and bottom right strokes 318 rather than group B composed of top stroke 314. FIG. 3B corresponds to blocks 202-204 of FIG. 2, described above. Thus, in FIGS. 3A-3B a user enters a new stroke 302 and a stroke grouping module compares the stroke S against all groups $G_1 \ldots G_N$. The stroke grouping module creates a new group $G_{N+1} = \{S\}$ if the new stroke cannot be matched to any existing group or adds stroke S to the best matching group $G_K$ (FIG. 3B).

In FIG. 3C, a third sketch 320 shows division of group A composed of bottom left strokes 326, bottom right strokes 328 and new stroke 322 into Group $A_1$ composed of bottom left strokes 326, Group $A_2$ composed of new stroke 322 and Group $A_3$ composed of bottom right strokes 328. Group B remains composed of top stroke 314. FIG. 3C corresponds to block 208 of FIG. 2, described above.

In FIG. 3D, a fourth sketch 330 shows a recombination of group A composed of bottom right strokes 328 and Group B composed of bottom left strokes 326, new stroke 322 and top stroke 314. FIG. 3D corresponds to block 208 of FIG. 2, described above. Two groups complement each other well (and are described as being self-coherent) if their merging does not significantly alter the group properties of the individual groups. A group is self-coherent with respect to a certain group property if adding one or more strokes, which contribute to the evaluation of the group property, to the group, does not significantly affect that group property. For example, if the group property considered is "horizontally aligned", then adding horizontal strokes will retain the self-coherence of the group, while adding vertical strokes will diminish the self-coherence of the combined group. Even in cases where a small decrease in self-coherence of the combined group is detected, such a decrease in self-coherence of the group may still be preferable to a large number of smaller groups. In one embodiment, the preference for reductions in group self-coherence over a profusion of small groups may be encoded in terms of an optimization process that tries to minimize the number of resulting groups after a merge operation, each of which should not significantly change in their self-coherence properties. In one example, a trivial case of a split and merge sequence may look like:

Split(A)→{$A_1, A_2, A_N$}
Merge($A_1, A_2, A_N$, B, C, D)→(A={$A_1, A_2, A_N$}, B, C, D), where B, C, D are groups neighboring A Thus, the groups before and after the split/merge sequence may be the same. However, one embodiment of this process is designed to reduce the likelihood that earlier grouping errors propagate in time and prevent subsequent grouping accuracy, as local additions to the sketch result in local re-grouping that is preferred according to the merging and splitting criteria specified by the implementation.

Group Merger and Division

Figure 4:
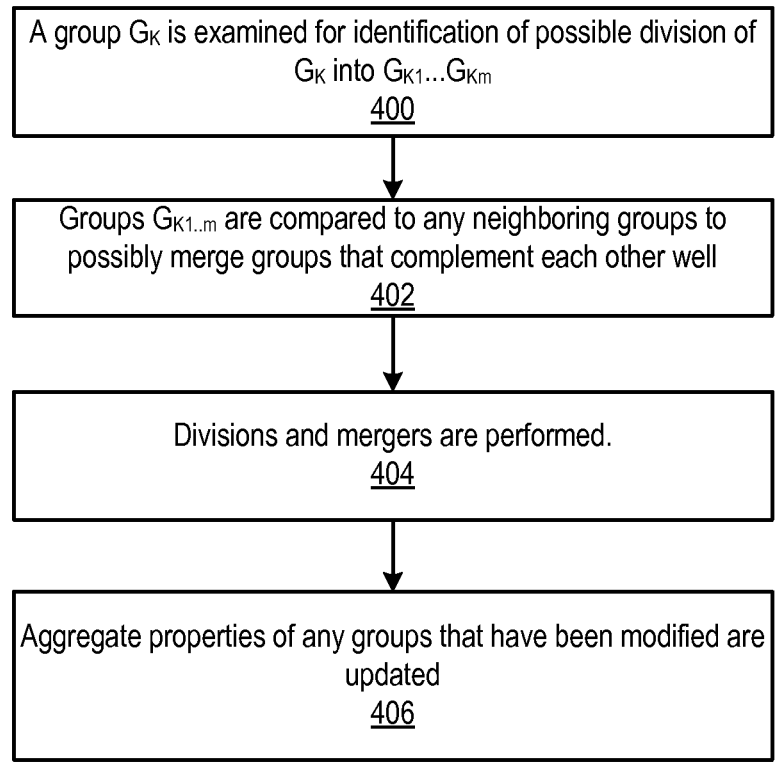
FIG. 4 illustrates a high-level logical flowchart of operations used for mergers and divisions of groups according to one embodiment.

FIG. 4 illustrates a high-level logical flowchart for mergers and divisions of groups according to one embodiment. A group $G_K$ is examined for identification of possible divisions of $G_K$ into $G_{K1} \ldots G_{Km}$ (400). Any suitable splitting criterion may be used. As an example, one criterion might be to partition a given group into the fewest number of sub-groups that have more self-consistent group properties than the original group.

Groups $G_{K1 \ldots m}$ are compared to any neighboring groups to possibly merge groups that complement each other well (block 402). Divisions and mergers are performed (404) as in FIGS. 3C-3D above. Aggregate properties of any groups that have been modified are updated (406).

Figures 5A, 5B:
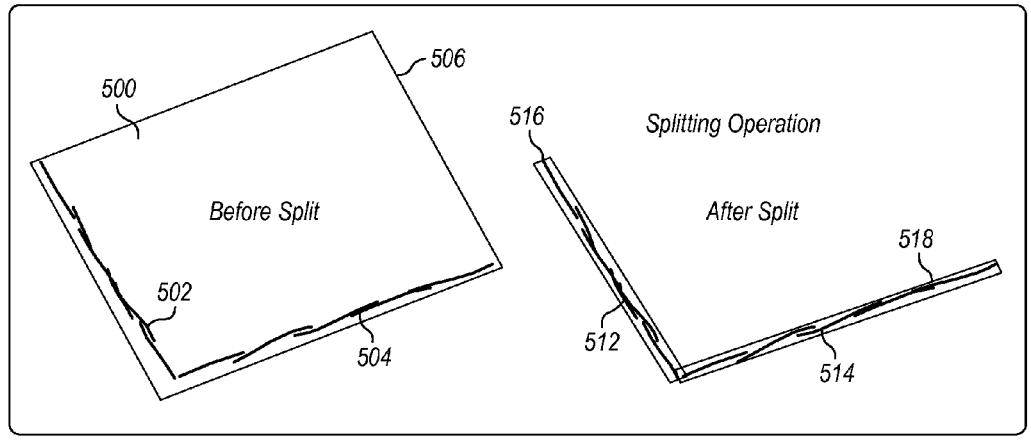
FIGS. 5A-5B illustrate an example of a sketch suitable for group division according to one embodiment.

FIGS. 5A-5B illustrate an example of a sketch suitable for group division according to one embodiment. Group 500 is composed of a left side 502 and a right side 504. As an example of one embodiment of a group division according to criteria, one criterion might be to partition a given group into the fewest number of sub-groups that have more self-consistent group properties than the original group. For example, the object-oriented bounding box 506 (OOBB) of group 500 does not exhibit a strong directionality (as measured by the ratio of side-lengths). In contrast, the OOBB 516 of subgroup 512 and the OOBB 518 of subgroup 514 each exhibit strong directionality. The grouping discussed with respect to FIGS. 5A-5B is an example only and any number of aggregate group properties may be used to ascertain the self-coherence of a group. Thus, greater self-consistency of groupings with respect to the directionality of object-oriented bounding boxes for groups would be achieved by dividing group 500 into subgroup 512 and subgroup 514. An embodiment focused on self-consistency of groupings with respect to the directionality of object-oriented bounding boxes divides group 500 into subgroup 512 and subgroup 514.

Selection Mechanisms

Figures 6A, 6B, 6C:
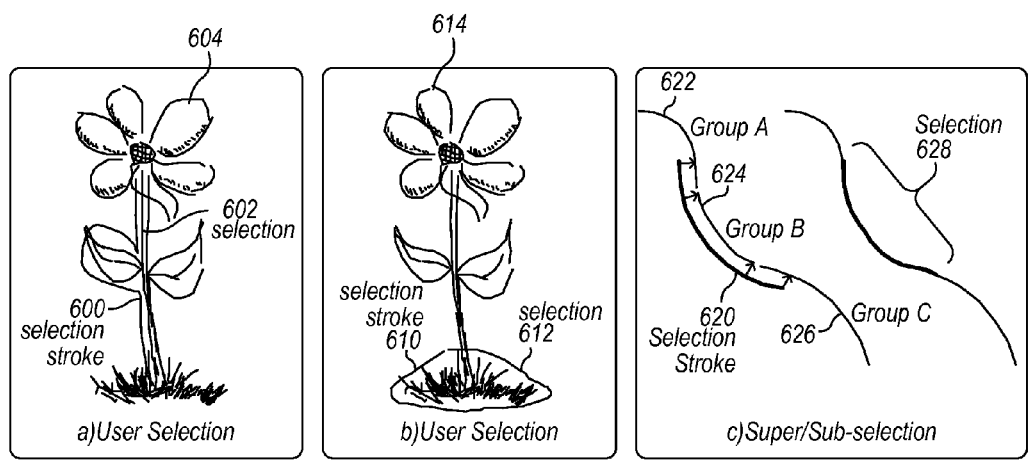
FIGS. 6A-6C illustrate examples of user selection mechanisms applicable to one embodiment of a system and method for stroke grouping for high-level editing.

FIGS. 6A-6C illustrate examples of user selection mechanisms applicable to one embodiment of a system and method for stroke grouping for high-level editing. FIG. 6A illustrates a user selection stroke 600 with respect to a selection 602 of an image 604. User entry or editing of groups, discussed briefly above with respect to block 210 of FIG. 2A, offers facilities for a user to create groups or to correct situations in which auto-groupings suggested by a stroke grouping module do not conform to user expectations. Various causes of groupings that do not conform to user expectations include incorrect assignment of strokes to groups and a level of detail too low or high compared to that required by the user.

Some discrepancies between auto-created groups and user expectations reflect failures of a stroke grouping module and are to be expected with respect to the irregularities and randomness of real-world data. Alternatively, the stroke grouping module may not perform as expected, because the user's intended selection is either smaller than a whole group (sub-selection) or comprises parts of several groups (super-selection). A selection stroke 600 indicates a user preference with respect to grouping. Note that embodiments allow for application of a selection stroke 600 that is not particularly exact and only roughly follows the contour of the desired selection 602. Unlike prior art selection mechanisms that require significant attention to user accuracy and significant effort to achieve an accurate selection, automatic pre-grouping by a stroke grouping module significantly lowers accuracy requirements for user accuracy.

In some embodiments, a stroke grouping module compares the shape of selection stroke 600 to stroke groups in the vicinity of selection stroke 600. Note that, in one embodiment, stroke grouping module does not require that the selection stroke intersect with desired selection 602 or encompass selection 602 completely. In one embodiment, stroke grouping module can identify selection 602 so long as selection stroke 600 is shaped in a manner more similar to a nearby stroke group (or combination of stroke groups) than to any other nearby stroke group (or combination thereof). Similarity may be computed using any suitable shape-matching approach, such as ICP (Iterative Closest Point), Shape Graphs, etc.

The interpretation of a selection stroke may depend not only on the shape of selection stroke 600, but also on the classes of the stroke groups that the selection stroke is compared against, which are discussed below. For example, selection stroke 600 in FIG. 6A qualitatively follows the contour strokes on the left hand side of image 604, whereas a selection stroke 610 in FIG. 6B roughly follows the shape of the convex hull of the texture strokes representing grass in selection 612 of image 614. In both examples of FIGS. 6A and 6B, the shapes of selection stroke 600 and selection stroke 610 do not match perfectly the shape of selection 610 and selection 612, respectively, but the shapes of selection stroke 600 and selection stroke 610 match selection 610 and selection 612 better than any other selection, respectively.

FIG. 6C illustrates a selection across stroke subgroups. A single selection stroke 620 is used to select both subsets (group A 622 and group B 624) of a stroke group, and multiple stroke groups, possibly at the same time. In the example presented in FIG. 6C, selection stroke 620 selects the bottom part of the top stroke group (group A 622), the entire middle stroke group (group B 624), and the top part of the bottom stroke group (group C 626) in identifying selection 628.

In some embodiments, the speed at which the selection stroke 620 is drawn may influence the assumed precision of the desired selection 628. That is, a selection stroke 620 that is drawn very quickly is assumed in such embodiments to allow for a large matching error, while a selection stroke 620 that is drawn slowly and deliberately may indicate that the user is making a very careful selection and that measures of acceptable matching error in selection should be minimized. In the case where a selection stroke creates ambiguous candidates for selection 628, the system may select the candidates with the lower matching error, or present all possible candidates to the user for disambiguation. Note that, in some embodiments, the selection approach described above does not strictly require the existence of automatically formed groups and could be performed on raw strokes (without pre-existing groupings). However, such matching results are, in some embodiments, more error-prone and noisy, due to the lack of non-local structure of such an approach and may be more computationally expensive, because the combinatorial nature of nearby elements increases exponentially.

Some embodiments of a stroke grouping module automatically group related input strokes into more easily editable groups. Any mechanism, method or algorithm that is capable of reliably assigning a stroke to a group to which the stroke structurally relates may be employed by a stroke grouping module within the scope and intent of the embodiments disclosed herein. In one embodiment, a trivial mechanism to infer stroke grouping is to look at the end-points distance between two points, i.e. the distance between where ones stroke ends and the next one begins. In many cases, strokes that have a small end-point separation are structurally related. While computing the end-point distance between a new stroke and the strokes of any group may be used as one component of assignment of a stroke to a stroke grouping, some embodiments employ algorithms more complex than simply assigning the stroke to the grouping that contains the closest stroke to the new stroke.

Machine Learning

As one skilled in the art will infer in light of having read the present disclosure, the space of possible metrics that can be computed between two strokes includes many options for ascertaining a relationship between strokes that would favor a stroke grouping. Some metrics are more discriminating than others for a particular sketch style, because every artist may have slightly different sketching behavior. The embodiments presented herein accommodate in the grouping behavior of a stroke grouping module the differences in artistic sketching behavior by employing machine learning algorithms to address the grouping function. In some embodiments, supervised machine learning is employed. Some applicable machine learning algorithms include Adaboost, discussed below, but other suitable learning mechanisms, such as Neural Networks, Supply Vector Machines (SVM), Bayesian Learning, etc. may be used similarly without departing from the scope and intent of the embodiments disclosed herein.

Referring briefly to FIG. 1, in one embodiment, a machine learning algorithm using a supervised learning approach may be described as having two stages, though operations related to each stage may executed iteratively. A first stage is a "learning" stage, in which the system analyzes the relationship between some input values and their associated labels using a learning module, such as learning module 160 discussed above with respect to FIG. 1. Label input is received into the system in the form of training data supplied by expert users. In one embodiment, these training data include images that are manually grouped by experts. As the system bootstraps itself, this data can be supplemented by images of the current user. The second stage is the "prediction" stage, in which the system uses its analysis of previous evidence to assign labels to new values by creating assignments of strokes to groups, such as the assignments created by group selection module 150 discussed above with respect to FIG. 1. Embodiments of the present invention may perform machine learning on the basis of training datasets consisting of sketches that have been grouped manually by an expert. Within embodiments of such datasets, there exist two labels: "Belong to the same group" and "Do NOT belong to the same group".

Given the attributes for each stroke, a group selection module 150 computes the attribute distances between all pairs of strokes within the same group and assigns these the first label. Techniques for computing distances between tuples will vary between embodiments. Common metrics include Euclidean distance, Manhattan distance, Earthmover's distance. The group selection module 150 then computes the attribute distances between all pairs of strokes from different group and assigns these the second label. These distance tuples, along with their labels are then fed learning module 160. The learning module 160 learns how well each attribute (entry in the distance tuple) is able to predict the correct label, what thresholds to use for assigning one or the other label based on the attribute distance, and how much to weight each attribute in the decision making process to assign a label. In some embodiments, this constitutes the "learning" phase of the system. As the user adds new strokes to the system, the machine learning "prediction" phase embodied by group selection module 150 compares the new stroke to existing ones in nearby groups and assigns an appropriate label.

Figure 7:
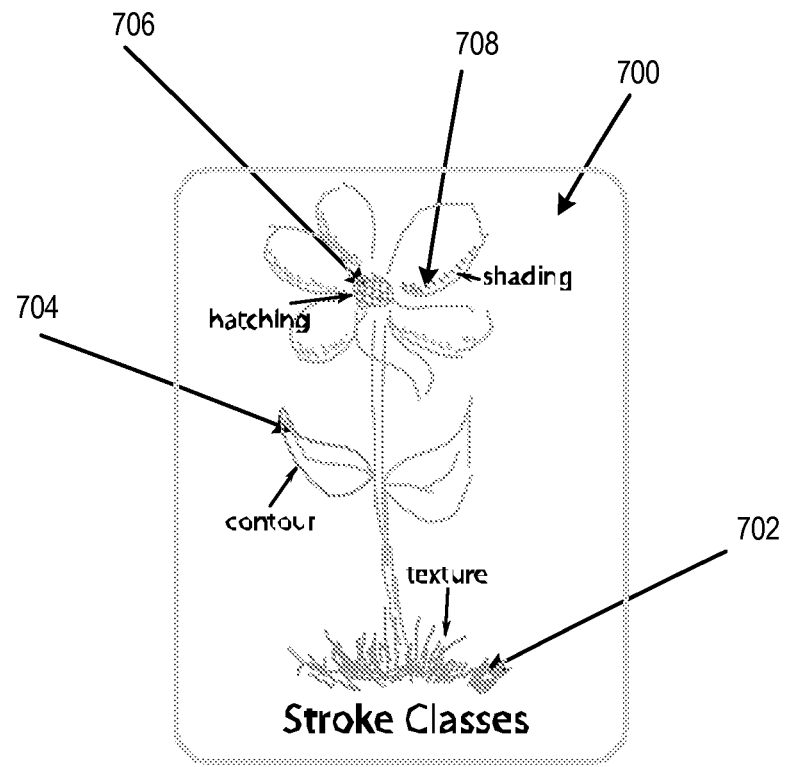
FIG. 7 illustrates an image with strokes linked by structural properties according to one embodiment.

Learning module 160 may also extend a similar learning approach to higher-level aspects of the drawing. For example, once strokes have been grouped into structures, an aggregate property may be diagnosed by a group selection module 150. FIG. 7 illustrates an image with strokes linked by structural properties according to one embodiment. Strokes may serve various structural purposes, depending on their configuration with respect to other strokes in the group. In FIG. 7, an image 700 includes strokes for texture 702, which may form a statistical distribution and represent textural elements, such as hair, fur, grass, etc. In other cases they may also be used simply to fill-in a region with a certain color. Image 700 further includes strokes for contour 704, which form the outline of a shape. Image 700 further includes strokes for hatching 706, which are often arranged in regular patterns and may indicate material properties of a depicted object, geometric distortions (such as bulging), or shading. Image 700 further includes strokes for shading 708, which are a special form of hatching used to indicate lighting effects (shadows or highlights). These are often drawn in short parallel lines and may be associated with a specific contour.

A multi-label variation of the learning approach discussed above is used in some embodiments to learn stroke class labels for groups of strokes. Such classification, in turn, may be useful in order to offer different selection methods and editing tools to the user, depending on the class of strokes the user indicates to edit.

Returning to FIG. 1, in some embodiments, a learning module, such as learning module 160, is configured to learn from a specific user (by training with sketches drawn and grouped manually by the user). In some embodiments, creating quantitative representations of an attribute stroke groups includes selecting the attribute based on an analysis of previous grouping selections by a current user. However, embodiments are designed such that group selection module 150 will still perform adequately for foreign training examples (e.g., examples not created by the user for whom grouping is being performed), as long as the two styles of drawing are sufficiently similar. In any case, some embodiments allow a foreign training set to be used to boot-strap the system, such that the system may then learn the user's preferences by taking into account usage of suggested automatic groupings and any user corrections of such groupings. With such an approach, the system can train to improve auto-groupings for a particular user over time.

Group selection module 150 may implement a variety of grouping approaches that may vary in complexity between embodiments. Among the simpler approaches, some embodiments implement a single, scale-independent automatic grouping behavior that assigns each individual stroke to one (and only one) stroke group. Such a simplified approach is sufficient for a number of applications. However, other embodiments enable a user to make selections that are dependent on scale. For example, when zoomed-in to a sketch, the selection might happen at the level of a "leaf", whereas when zoomed-out, the selection might happen at the level of a "tree." In some embodiments, group selection module 150 computes automatic groupings at different scale levels and automatically chooses a suitable detail level based on the current zoom. Furthermore, some embodiments of group selection module 150 record the scale at which a particular stoke was recorded (i.e. the zoom-level of the canvas), and use this information in determining an appropriate grouping level for the current editing zoom-level, thereby implementing a scale-sensitive selection stroke.

Some embodiments support implementation of scale-dependent grouping mechanisms through hierarchical grouping. In such embodiments, there exists a lowest level grouping that is equivalent to the simple automatic grouping discussed above. At the next higher level, the groups of the previous level are combined into super-groups based on machine learning (as above) or other heuristics. This process may be repeated for a number of desired hierarchy levels.

Some embodiments support another grouping method that allows a single stroke to belong to multiple groups, similar to the lattice groups described in work by Saund in Saund, E. (n.d.). Eric Saund Publications. Retrieved from http://www-.parc.com/about/people/167/eric-saund.html (Saund). The advantage of such an approach is that it does not force a stroke to belong to only one particular group, but it may belong to any group where it fits well.

Group-Based Image Editing

Given the auto-grouping and selection mechanisms enabled by embodiments of a stroke grouping module, some embodiments may support or allow applications to provide the user with functions to perform a number of high-level editing operations, in addition to the traditional affine transformations (e.g., rotate, scale, translates, skew). Referring briefly to FIG. 1, in some embodiments, group-based image editing tools 180 may provide operations that are known from other domains (e.g., 3D animation, raster-image deformation, physical simulation), and are enabled by the ability to (automatically) group sketch strokes. In some embodiments, several of the editing operations discussed below are specific to a particular class of stroke. While other examples exist in some embodiments and are within the scope and intent of the present disclosure, the following examples illustrate capabilities of embodiments herein disclosed.

Figure 8:
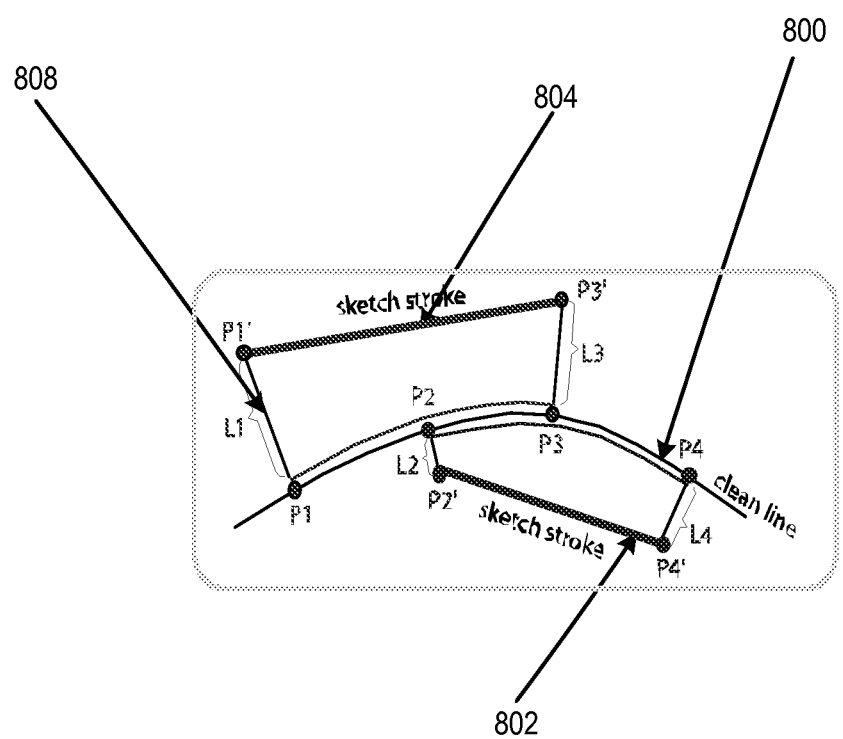
FIG. 8 illustrates a contour formed from a stroke grouping according to one embodiment.

FIG. 8 illustrates a contour formed from a stroke grouping according to one embodiment. A contour is generally manipulated via its "clean line" representation 800. Given a number of sketch strokes 802-804 that have been grouped together and classified as a contour, embodiments may compute a clean line representation 800 as an approximation to the shape of sketch strokes 802-804. A clean line may be represented as a polyline, a Bezier curve, or any other suitable geometric and/or parametric descriptor. One method to construct a clean line representation 800 is to use a constructive 2-phase grouping approach, such as that described above with respect to FIGS. 3C-3D. The clean line of a group consisting of a single sketch stroke is the sketch stroke itself. If a new stroke is added to a specific group, the existing clean line is modified to best approximate the extended group. If two groups are merged, their clean lines are merged. If a group is split, the clean line is split accordingly. In general, clean lines may be constructed by considering all the strokes within a group and by an optimization process that approximates the geometric data of the sketch strokes to form a simplified, single clean line.

In some embodiments, the clean line acts as a proxy for the group of sketch strokes it represents. One implementation may map sketch strokes 802-804 onto a clean line representation 800 as shown in FIG. 8. That is, control points of a sketch stroke are mapped onto a clean line representation 800 with two parameters (P,L). In such a (P,L) representation, P is the position on the clean line representation 800 that connects a control point to the clean line representation 800 with a line segment 808 that is perpendicular to clean line representation 800 at P. Likewise, L is the signed distance between the control point and P, such that P'=P+L*N(P), where N(P) is the normal of the clean line at (P). It is convenient to express P as an arc-length parameterization of the clean line: P=C(t), where C is a parametric description of the clean line (such as a Polyline, or Bezier curve), and t is a range-parameter, such that C(t=0.0) is the first point in the clean line, and C(t=1.0) is the last point. While this approach is well-suited to finding P' given a P, the reverse, finding a P given P', is non-trivial, as there are potentially many points along C whose normals pass through P'. Some embodiments support a method of disambiguation that chooses the P such that the corresponding L value is smallest.

Figure 9:
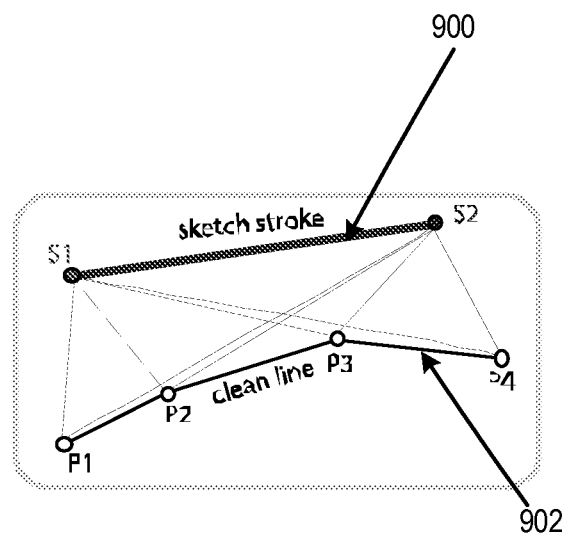
FIG. 9 illustrates an alternative representation of a contour formed from a stroke grouping according to one embodiment.

FIG. 9 illustrates an alternative representation of a contour formed from a stroke grouping according to one embodiment. Some embodiments will apply an alternative approach to mapping between sketch strokes 900 and clean lines 902. In such embodiments, control points of the sketch strokes 900 are expressed as linear combinations of control points along clean-line 902, such that $$S_j = \sum_i W_{ij} \cdot P_i.$$

Where, "i" iterates over all control points or less, but at least two. This approach is analogous to "skinning" as used in the context of 3D computer graphics.

Figure 10:
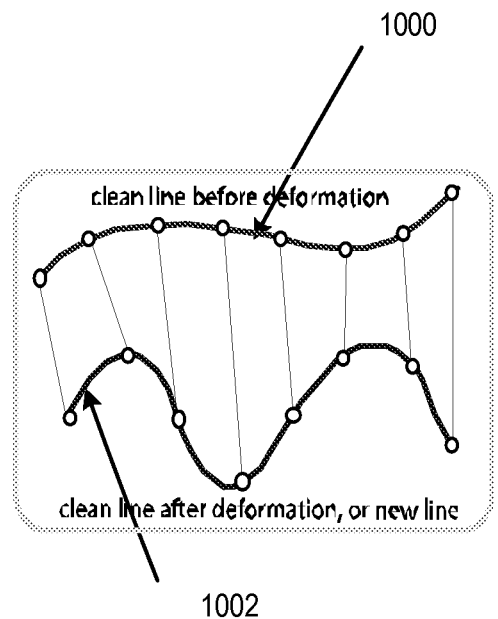
FIG. 10 illustrates a contour line deformation according to one embodiment.

FIG. 10 illustrates a contour line deformation according to one embodiment. In some embodiments, clean line representation 1000 of a group of sketch strokes may be deformed in any number of ways to generate a deformed clean line 1002. In some embodiments, examples of supported manipulations include direct manipulation of control-points. If the clean line 1000 is expressed as a geometric or parametric construct, then the control points of this construct may be moved around, thereby deforming the clean line 1000. In some embodiments, examples of supported manipulations include indirect manipulation. The user may manipulate one control point of the clean line 1000, and the effect of this manipulation may be propagated automatically to other control points of the clean line 1000. For example, if the clean line 1000 is a polyline, then the manipulation of one control point may exert a pull on its neighboring control points, and so on. The extent of such a deformation may be limited by constraining certain control points and preventing them from moving. In some embodiments, examples of such manipulations may include overdraw. The user may draw a totally new clean line. Given a similar parameterization of the original clean line 1000 and the new clean line 1002 (e.g. arc-length), control points from one may be mapped onto the other.

Figure 11:
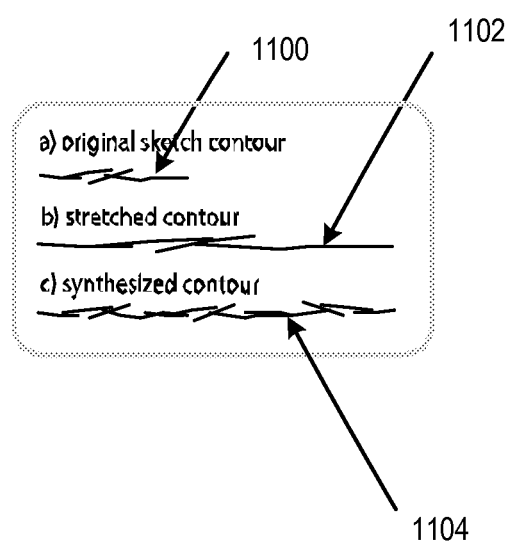
FIG. 11 illustrates a contour deformation via synthesis according to one embodiment.

FIG. 11 illustrates a contour deformation via synthesis according to one embodiment. In some embodiments, if the total arc-length of a clean line does not change considerably during a deformation operation, then the embodiment may take advantage of a simple back-mapping of sketch strokes from the clean-line parameterization into the current drawing as being sufficient to apply that editing operation to the sketch. However, for sufficiently severe deformations, a simple back-mapping from an original contour 1100 to a deformed contour 1102 may result in a stretched contour that has spatial characteristics at a different scale than the original contour before deformation. In situations where such a result is undesirable, embodiments support creation of a synthesized deformed contour 1104 by analyzing the spatial qualities of original contour 1100 and synthesizing a new contour with similar spatial qualities. Synthesized deformed contour 1104 results from a simple synthesis approach that constructs a new contour by copying original contour 1100 end-to-end several times, with random offsets, and random horizontal flipping. In alternative embodiments, any other suitable synthesis approach may be used, instead. For squeezing (deformed clean line is shorter than original clean line), a very simple solution might be to truncate parts of the original contour during the back-mapping process.

Figure 12:
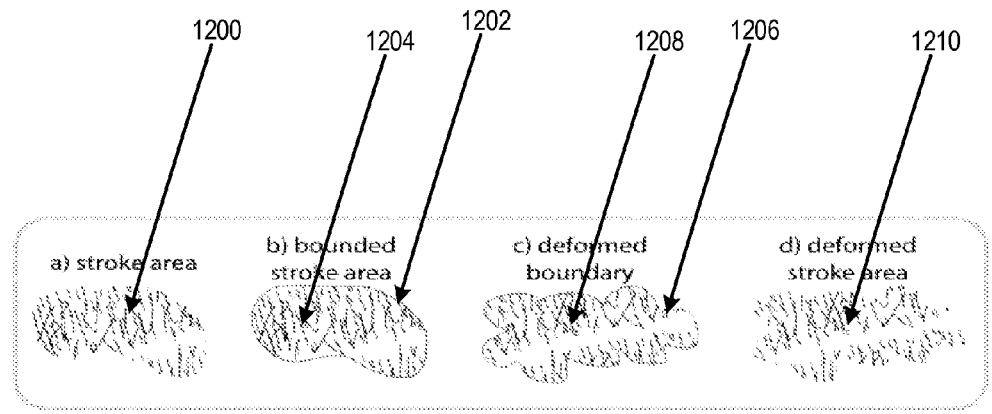
FIG. 12 illustrates area deformations according to one embodiment.
Figure 13:
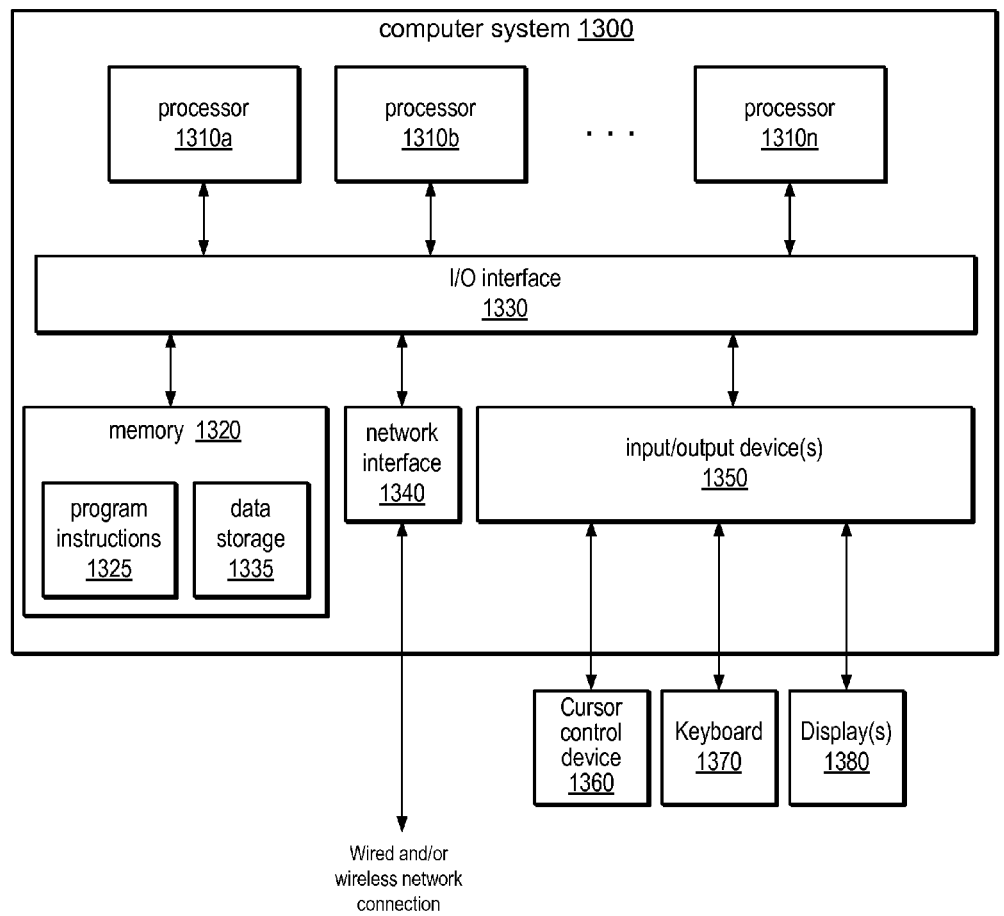
FIG. 13 illustrates an example computer system that may be used in embodiments.

FIG. 12 illustrates area deformations according to one embodiment. Several of the stroke classes described above, such as hatching or shading, are characterized by stroke properties contained within an area or region, rather than those aligned along a clean line. Some embodiments support suitable interactions that take into account this fundamental difference. A group of strokes is classified as a stroke area 1200 (e.g. texture, hatching, etc.). Embodiments define a bounding shape 1202 for the stroke area 1204. A user may deform the area boundary to create a user deformed area boundary 1206. Embodiments may respond to the user deformed area boundary 1206 by creating a deformed stroke area 1208. A deformed stroke area 1210 can persist even after the definition of user deformed area boundary 1206 is deleted.

In some embodiments, stroke areas may be deformed by deforming their boundary, as described above, or by applying virtual stretching forces to various points contained within the stroke area. This can be imagined as if the stroke area were covered by a sheet of rubber and that the user might be pulling on various points on that rubber sheet to deform it. In some embodiments, such a scheme can be implemented by mapping the stroke area to a suitable spatial data-structure (such as a triangular tessellation, regular grid, or similar), moving and constraining some of the nodes in such data-structure, and computing a smooth variation of deformations on all unconstrained nodes. Any other parametric or space-warp technique may also be used to deform the stroke area without departing from the scope and intent of the disclosed embodiments. In the case where deformations of areas would lead to severe stretching or squashing artifacts, the embodiments may employ cropping and/or stroke synthesis techniques, analogous to the contour deformation case described above.

The use of multi-touch technology is supported in various embodiments, specifically to allow the user to specify multiple simultaneous editing constraints. For example, in the case of contour deformations, the user may place two fingers on points of the contour to hold these points in place. Another finger may then drag an unconstrained point to a new position, while the virtual forces exerted by moving the unconstrained point are propagated to all other points, until stopped by the constrained points. In another example, the placement and motion of fingers on a multi-touch input may be interpreted as constraints to a space deformation, where the positions under the fingers move with the fingers, and other positions are interpolated to vary smoothly between constraints. Given the fact that a touch-sensitive input generally has less spatial accuracy than some other pointing devices (such as a mouse, a stylus, etc.), some embodiments offer a significant advantage for touch-input driven sketching applications. Namely, selections may be executed sloppily, yet lead to accurate selection results. Additionally, high-level editing operations (e.g., line dragging, space-warping, etc.) are easier for the user, in some embodiments, to perform via low-fidelity input than those that require precise cursor placement (such as interacting with handles and widgets of traditional vector editing interfaces).

Deformations applied to the current user selection of strokes may result in a configuration of strokes that should be grouped differently from the pre-deformation grouping. To address this issue, some embodiments invoke after deformation a split/merge sequence of all edited and neighboring groups, such as that discussed above with respect to new stroke entry.

Embodiments have been discussed with respect to editing digital sketches, but embodiments can be applied beneficially in a wider context without departing from the scope and intent of the present disclosure. Specifically, grouping can be supported by some embodiments as a temporally less ephemeral variant of selection. Even without the use of grouping structures, embodiments can be used to facilitate the construction of temporary selections. Similarly, layering may be supported by some embodiments as a special form of grouping, where all the elements in one group are considered to lie in a specific layer in a multi-layer image representation.

Some embodiments further support application of the methods and operations discussed above in the context of raster graphics or other graphical constructs, as well. For example, in some embodiments, a new raster graphics element, introduced into an existing image is compared to any existing structure computed from the image (and its construction), based on similarity features (e.g., color differences, shape descriptors, texture properties, etc.). Based on these similarities an automatic grouping or layering is applied in a similar fashion as discussed above.

In some embodiments, constructing clean line representations of stroke groups allows additional applications. For example, the clean lines are displayed instead of the raw inputs strokes, giving a simpler, "cleaner" looking approximation of the input strokes. This process is sometimes referred to as "Beautification" and was described by Baran, Lehtinen, & Popović. Additionally, the clean lines (and by proxy mechanism the associated sketch strokes) are subject to stylistic deformations, such as making clean lines more jittery or wavy, thereby reducing the "clean" look of a drawing. Some embodiments also support style-transfer. Given a drawing A, its clean lines and sketch strokes, and another drawing B with clean lines and sketch strokes, such embodiments learn a mapping technique from clean lines to sketch strokes in image A, and apply it to the clean lines of image B, thereby transferring the sketch style from image A onto the structure in image B.

Example System

Embodiments of a stroke grouping module and/or of the stroke grouping-based image editing techniques as described herein may be executed on one or more computer systems, which may interact with various other devices. One such computer system is illustrated by FIG. 13. In different embodiments, computer system 1300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1300 includes one or more processors 1310 coupled to a system memory 1320 via an input/output (I/O) interface 1330. Computer system 1300 further includes a network interface 1340 coupled to I/O interface 1330, and one or more input/output devices 1350, such as cursor control device 1360, keyboard 1370, and display(s) 1380. In some embodiments, it is contemplated that embodiments may be implemented using a single instance of computer system 1300, while in other embodiments multiple such systems, or multiple nodes making up computer system 1300, may be configured to host different portions or instances of embodiments. For example, in one embodiment some elements may be implemented via one or more nodes of computer system 1300 that are distinct from those nodes implementing other elements.

In various embodiments, computer system 1300 may be a uniprocessor system including one processor 1310, or a multiprocessor system including several processors 1310 (e.g., two, four, eight, or another suitable number). Processors 1310 may be any suitable processor capable of executing instructions. For example, in various embodiments, processors 1310 may be general-purpose or embedded processors implementing any of a variety of instruction set architectures (ISAs), such as the x86, PowerPC, SPARC, or MIPS ISAs, or any other suitable ISA. In multiprocessor systems, each of processors 1310 may commonly, but not necessarily, implement the same ISA.

In some embodiments, at least one processor 1310 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1320 may be configured to store program instructions and/or data accessible by processor 1310. In various embodiments, system memory 1320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a stroke grouping-based image editing module are shown stored within system memory 1320 as program instructions 1325 and data storage 1335, respectively. In other embodiments, program instructions and/or data may be received, sent or stored upon different types of computer-accessible media or on similar media separate from system memory 1320 or computer system 1300. Generally speaking, a computer-accessible medium may include storage media or memory media such as magnetic or optical media, e.g., disk or CD/DVD-ROM coupled to computer system 1300 via I/O interface 1330. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1340.

In one embodiment, I/O interface 1330 may be configured to coordinate I/O traffic between processor 1310, system memory 1320, and any peripheral devices in the device, including network interface 1340 or other peripheral interfaces, such as input/output devices 1350. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. In addition, in some embodiments some or all of the functionality of I/O interface 1330, such as an interface to system memory 1320, may be incorporated directly into processor 1310.

Network interface 1340 may be configured to allow data to be exchanged between computer system 1300 and other devices attached to a network, such as other computer systems, or between nodes of computer system 1300. In various embodiments, network interface 1340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1350 may, in some embodiments, include one or more display terminals, keyboards, keypads, touchpads, scanning devices, voice or optical recognition devices, or any other devices suitable for entering or retrieving data by one or more computer system 1300. Multiple input/output devices 1350 may be present in computer system 1300 or may be distributed on various nodes of computer system 1300. In some embodiments, similar input/output devices may be separate from computer system 1000 and may interact with one or more nodes of computer system 1300 through a wired or wireless connection, such as over network interface 1340.

As shown in FIG. 13, memory 1320 may include program instructions 1325, configured to implement embodiments of a stroke grouping module as described herein, and data storage 1335, comprising various data accessible by program instructions 1325. In one embodiment, program instructions 1325 may include software elements of embodiments of a stroke grouping module as illustrated in the above Figures. Data storage 1335 may include data that may be used in embodiments. In other embodiments, other or different software elements and data may be included.

Those skilled in the art will appreciate that computer system 1300 is merely illustrative and is not intended to limit the scope of a stroke grouping module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1300 may be transmitted to computer system 1300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    establishing, by a computing device, a quantitative representation of an attribute of a graphical element to compare attributes of the graphical element to attributes of one or more groups of graphical elements;
    creating respective quantitative representations of an attribute of each of the one or more groups of graphical elements, the respective quantitative representations of the attribute of each of the one or more groups of graphical elements corresponding to the quantitative representation of the attribute of the graphical element, and the attribute of each of the one or more groups of graphical elements being selected based on previous grouping selections by a current user;
    identifying a similarity between the graphical element and the group of graphical elements by comparing the quantitative representation of the attribute of the graphical element to the respective quantitative representations of the attribute of each of the one or more groups of graphical elements; and
    responsive to identifying the similarity between the graphical element and a group of graphical elements among the one or more groups, adding the graphical element to the group of graphical elements to enable editing operations performed with respect to the group of graphical elements to result in changes to the graphical element.

2. The method of claim 1, wherein:
    creating the respective quantitative representations of the attribute of each of the one or more groups of graphical elements further comprises calculating an aggregate attribute value for one or more graphical elements of each of the one or more groups of graphical elements; and
    comparing the quantitative representation of the attribute of the graphical element to the respective quantitative representations of the attribute of each of the one or more groups of graphical elements further comprises comparing the quantitative representation of the attribute of the graphical element to the aggregate attribute value for the one or more graphical elements of each of the one or more groups of graphical elements.

3. The method of claim 1, wherein adding the graphical element to the group of graphical elements further comprises adding the graphical element to a group of graphical elements represented by a clean-line representation that comprises a simplified representation of the graphical elements of the group configured to reduce at least a visual complexity of the group of graphical elements.

4. The method of claim 1, further comprising performing mergers and divisions of the one or more groups by dividing a group among the one or more groups into the fewest number of subgroups that have more self-consistent attributes than the group divided among the one or more groups.

5. The method of claim 1, further comprising allowing a user to manually create a group on the basis of a scale-sensitive selection stroke.

6. A system, comprising:
- at least one processor; and
- a memory comprising program instructions, wherein the program instructions are executable by the at least one processor to:
  - establish a quantitative representation of an attribute of a graphical element to compare attributes of the graphical element to attributes of one or more groups of graphical elements;
  - create respective quantitative representations of an attribute of each of the one or more groups of graphical elements, the respective quantitative representations of the attribute of each of the one or more groups of graphical elements corresponding to the quantitative representation of the attribute of the graphical element, and the attribute of each of the one or more groups of graphical elements being selected based on previous grouping selections by a current user;
  - identify a similarity between the graphical element and the group of graphical elements by comparing the quantitative representation of the attribute of the graphical element to the respective quantitative representations of the attribute of each of the one or more groups of graphical elements; and
  - responsive to the similarity between the graphical element and a group of graphical elements among the one or more groups, add the graphical element to the group of graphical elements to enable editing operations performed with respect to the group of graphical elements to result in changes to the graphical element.

7. The system of claim 6, wherein:
- the program instructions executable by the at least one processor to create the respective quantitative representations of the attribute of each of the one or more groups of graphical elements further comprise program instructions executable by the at least one processor to calculate an aggregate attribute value for one or more graphical elements of each of the one or more groups of graphical elements; and
- the program instructions executable by the at least one processor to compare the quantitative representation of the attribute of the graphical element to the respective quantitative representations of the attribute of each of the one or more groups of graphical elements further comprise program instructions executable by the at least one processor to compare the quantitative representation of the attribute of the graphical element to the aggregate attribute value for the one or more graphical elements of each of the one or more groups of graphical elements.

8. The system of claim 6, wherein the program instructions executable by the at least one processor to add the graphical element to the group of graphical elements further comprise program instructions executable to add the graphical element to a group of graphical elements represented by a clean-line representation that comprises a simplified representation of the graphical elements of the group configured to reduce at least a visual complexity of the group of graphical elements.

9. The system of claim 6, further comprising program instructions executable by the at least one processor to perform mergers and divisions of the one or more groups by dividing a group among the one or more groups into the fewest number of subgroups that have more self-consistent attributes than the group divided among the one or more groups.

10. The system of claim 6, further comprising program instructions executable by the at least one processor to allow a user to manually create a group on the basis of a scale-sensitive selection stroke.

11. A computer-readable storage device storing program instructions, wherein the program instructions are computer-executable to perform operations comprising:
- establishing a quantitative representation of an attribute of a graphical element to compare attributes of the graphical element to attributes of one or more groups of graphical elements;
- creating respective quantitative representations of an attribute of each of the one or more groups of graphical elements, the respective quantitative representations of the attribute of each of the one or more groups of graphical elements corresponding to the quantitative representation of the attribute of the graphical element, and the attribute of each of the one or more groups of graphical elements being selected based on previous grouping selections by a current user;
- identifying a similarity between the graphical element and the group of graphical elements by comparing the quantitative representation of the attribute of the graphical element to the respective quantitative representations of the attribute of each of the one or more groups of graphical elements; and
- responsive to identifying the similarity between the graphical element and a group of graphical elements among the one or more groups, adding the graphical element to the group of graphical elements to enable editing operations performed with respect to the group of graphical elements to result in changes to the graphical element.

12. The computer-readable storage device of claim 11, wherein:
- creating the respective quantitative representations of the attribute of each of the one or more groups of graphical elements further comprises calculating an aggregate attribute value for one or more graphical elements of each of the one or more groups of graphical elements; and
- comparing the quantitative representation of the attribute of the graphical element to the respective quantitative representations of the attribute of each of the one or more groups of graphical elements further comprises comparing the quantitative representation of the attribute of the graphical element to the aggregate attribute value for the one or more graphical elements of teach of the one or more groups of graphical elements.

13. The computer-readable storage device of claim 11, wherein adding the graphical element to the group of graphical elements further comprises adding the graphical element to a group of graphical elements represented by a clean-line representation that comprises a simplified representation of the graphical elements of the group configured to reduce at least a visual complexity of the group of graphical elements.

14. The computer-readable storage device of claim 11, further comprising program instructions computer-executable to implement performing mergers and divisions of the one or more groups by dividing a group among the one or more groups into the fewest number of subgroups that have more self-consistent attributes than the group divided among the one or more groups.

15. The method of claim 3, wherein the simplified representation of the graphical elements of the group is further configured to reduce a computational complexity of the group of graphical elements.

16. The method of claim 4, further comprising performing the mergers and divisions of the one or more groups by merging at least two of the one or more groups that are determined to have consistent attributes into one larger group.

17. The system of claim 8, wherein the simplified representation of the graphical elements of the group is further configured to reduce a computational complexity of the group of graphical elements.

18. The system of claim 9, further comprising program instructions computer-executable by the at least one processor to perform the mergers and divisions of the one or more groups by merging at least two of the one or more groups that are determined to have consistent attributes into one larger group.

19. The computer-readable storage device of claim 13, wherein the simplified representation of the graphical elements of the group is further configured to reduce a computational complexity of the group of graphical elements.

20. The computer-readable storage device of claim 14, further comprising performing the mergers and divisions of the one or more groups by merging at least two of the one or more groups that are determined to have consistent attributes into one larger group.

* * * * *

UNITED STATES PATENT AND TRADEMARK OFFICE
CERTIFICATE OF CORRECTION

PATENT NO. : 8,669,995 B2  
APPLICATION NO. : 12/957019  
DATED : March 11, 2014  
INVENTOR(S) : Winnemoeller et al.

Page 1 of 1

It is certified that error appears in the above-identified patent and that said Letters Patent is hereby corrected as shown below:

In the Claims

Column 20, Line 52, Claim 12, after "...graphical elements of" delete "teach", insert -- each --, therefor.

Signed and Sealed this  
Sixth Day of May, 2014

Michelle K. Lee  
*Deputy Director of the United States Patent and Trademark Office*